(12) United States Patent
Kim et al.

(10) Patent No.: US 12,257,903 B2
(45) Date of Patent: Mar. 25, 2025

(54) HYBRID DRIVING MODULE

(71) Applicant: VALEO KAPEC CO., LTD., Daegu (KR)

(72) Inventors: Jung-Woo Kim, Daegu (KR); Jin-Su Park, Daegu (KR)

(73) Assignee: VALEO KAPEC CO., LTD., Daegu (KR)

(*) Notice: Subject to any disclaimer, the term of this patent is extended or adjusted under 35 U.S.C. 154(b) by 295 days.

(21) Appl. No.: 17/760,014

(22) PCT Filed: Jan. 22, 2021

(86) PCT No.: PCT/KR2021/000868
§ 371 (c)(1),
(2) Date: Aug. 3, 2022

(87) PCT Pub. No.: WO2021/157921
PCT Pub. Date: Aug. 12, 2021

(65) Prior Publication Data
US 2023/0038832 A1   Feb. 9, 2023

(30) Foreign Application Priority Data

Feb. 4, 2020 (KR) .................. 10-2020-0012938

(51) Int. Cl.
*B60K 6/26* (2007.10)
*B60K 6/38* (2007.10)
(Continued)

(52) U.S. Cl.
CPC .................. *B60K 6/26* (2013.01); *B60K 6/38* (2013.01); *F16D 13/644* (2013.01); *F16D 25/10* (2013.01);
(Continued)

(58) Field of Classification Search
CPC ...... B60K 6/26; B60K 6/38; B60K 2006/262; F16D 13/644; F16D 25/10; B60Y 2200/92
See application file for complete search history.

(56) References Cited

U.S. PATENT DOCUMENTS 6,258,001 B1   7/2001   Wakuta et al.
9,481,234 B2   11/2016   Ideshio et al.
(Continued)

FOREIGN PATENT DOCUMENTS

CN   1926001 A   3/2007
CN   101332763 A   12/2008
(Continued)

OTHER PUBLICATIONS

International Search Report issued Apr. 22, 2021 in PCT/KR2021/000868, filed on Jan. 22, 2021, 3 pages.
(Continued)

Primary Examiner — Jacob B Meyer
(74) Attorney, Agent, or Firm — Oblon, McClelland, Maier & Neustadt, L.L.P.

(57) ABSTRACT

The present invention relates to a hybrid driving module, in which an input member is aligned in a radial direction and/or an axial direction by a rotor hub, and thus the hybrid driving module may be easily assembled and ensure the high axial balance and the operability and durability of the engine clutch. In the hybrid driving module, the input member may be aligned at least in the radial direction or in the axial direction by a central shaft extension part of the rotor hub. A bearing configured to support a rotation and thrust may be installed between the central shaft extension part and the input member. The input member may be supported to be (Continued)

rotatable relative to a housing. The input member may be aligned in the radial direction and/or the axial direction by the housing.

12 Claims, 11 Drawing Sheets

(51) Int. Cl.
  *F16D 13/64* (2006.01)
  *F16D 25/10* (2006.01)
(52) U.S. Cl.
  CPC ..... *B60K 2006/262* (2013.01); *B60Y 2200/92* (2013.01)

(56) References Cited

U.S. PATENT DOCUMENTS

| | | | |
|---|---|---|---|
| 9,950,605 B2 * | 4/2018 | Suyama | ............ F16D 21/06 |
| 10,663,012 B2 | 5/2020 | Lorenz | |
| 10,865,836 B2 | 12/2020 | Lorenz et al. | |
| 2006/0289209 A1 | 12/2006 | Grosspietsch et al. | |
| 2009/0054203 A1 | 2/2009 | Heeke | |
| 2013/0192945 A1 | 8/2013 | Frait et al. | |
| 2018/0231067 A1 | 8/2018 | Lorenz | |
| 2018/0283469 A1 | 10/2018 | Lorenz et al. | |
| 2018/0313409 A1 * | 11/2018 | Iizuka | ............ F16D 25/0638 |
| 2023/0012163 A1 * | 1/2023 | Kim | ............ F16H 57/021 |
| 2023/0038832 A1 * | 2/2023 | Kim | ............ F16D 25/10 |
| 2023/0043913 A1 * | 2/2023 | Kim | ............ B60K 6/38 |
| 2024/0001755 A1 * | 1/2024 | Kim | ............ B60K 6/383 |
| 2024/0063683 A1 * | 2/2024 | Kim | ............ B60K 6/387 |
| 2024/0066972 A1 * | 2/2024 | Kim | ............ H02K 7/006 |

FOREIGN PATENT DOCUMENTS

| | | | | | |
|---|---|---|---|---|---|
| CN | 101678752 A | | 3/2010 | | |
| CN | 103223851 A | | 7/2013 | | |
| CN | 103223856 A | | 7/2013 | | |
| CN | 104773059 A | | 7/2015 | | |
| CN | 107923445 A | | 4/2018 | | |
| CN | 107923446 A | | 4/2018 | | |
| CN | 108790778 A | | 11/2018 | | |
| CN | 110312879 B | * | 8/2022 | ............ | B60K 6/40 |
| DE | 10 2008 026 426 A1 | | 12/2008 | | |
| DE | 10 2011 078 110 A1 | | 12/2012 | | |
| DE | 199 62 507 B4 | | 12/2018 | | |
| DE | 10 2018 205 467 A1 | | 10/2019 | | |
| DE | 10 2018 205 473 A1 | | 10/2019 | | |
| JP | 2006-298272 A | | 11/2006 | | |
| JP | 2011183946 A | * | 9/2011 | ............ | B60K 6/40 |
| JP | 7101262 B2 | * | 7/2022 | ............ | B60K 6/38 |
| KR | 10-2010-0008470 A | | 1/2010 | | |
| KR | 10-1428081 B1 | | 8/2014 | | |
| KR | 10-2018-0040682 A | | 4/2018 | | |
| KR | 20210138437 A | * | 11/2021 | | |
| KR | 20220097228 A | * | 7/2022 | | |
| KR | 20220097229 A | * | 7/2022 | | |
| KR | 20220097286 A | * | 7/2022 | | |
| KR | 20220162652 A | * | 12/2022 | | |
| KR | 20220162662 A | * | 12/2022 | | |
| KR | 20230028194 A | * | 2/2023 | | |
| KR | 20230028195 A | * | 2/2023 | | |
| KR | 20230028196 A | * | 2/2023 | | |
| KR | 20230071638 A | * | 5/2023 | | |
| KR | 20230100813 A | * | 7/2023 | | |
| WO | WO-2021118054 A1 | * | 6/2021 | ............ | B60K 11/02 |
| WO | WO-2021157921 A1 | * | 8/2021 | ............ | B60K 6/26 |
| WO | WO-2022146066 A1 | * | 7/2022 | ............ | B60K 6/26 |
| WO | WO-2023090697 A1 | * | 5/2023 | ............ | B60K 6/24 |

OTHER PUBLICATIONS

Combined Chinese Office Action and Search Report issued Mar. 22, 2024, in corresponding Chinese Patent Application No. 202180012459.1 (with English Translation and English Translation of Category of Cited Documents) 14 pages.

* cited by examiner

HYBRID DRIVING MODULE

TECHNICAL FIELD

The present invention relates to a hybrid driving module, and more particularly, to a hybrid driving module, in which an input member is aligned in a radial direction and/or an axial direction by a rotor hub, and thus the hybrid driving module may be easily assembled and ensure the high axial balance and the operability and durability of the engine clutch.

BACKGROUND ART

A driving module used for a hybrid vehicle has a structure configured to transmit a force of a motor and a force of an engine to a transmission. A hybrid driving module includes an input member configured to receive the force of the engine, a motor, an engine clutch configured to connect the input member and the motor, an output member configured to receive the force of the motor and/or the engine and transmit the force to the transmission, and a power transmission part configured to connect the motor and the output member. The power transmission part may have a structure configured to connect the motor directly to the output member or including a torque converter and a lock-up clutch.

The motor includes a stator and a rotor, and the rotor may be installed on a rotor hub. A space in which the clutch and the like are installed is provided in a radial internal space of the rotor defined by the rotor hub. After the clutch and the like are installed in the space, a cover or a hub ridge is installed to cover the space. The hub ridge is installed to rotate integrally with the rotor hub.

The stator is installed in a housing. Further, the input member, the rotor hub, the output member, and the like are installed to be rotatable relative to the housing.

DE 102008026426 A1 (Patent Document 1), U.S. Ser. No. 09/481,234 B2 (Patent Document 2), US 20060289209 A1 (Patent Document 3), and DE 19962507 B4 (Patent Document 4) each disclose a structure in which an input member of a hybrid driving module is installed. The input member disclosed in Patent Document 1 is supported only in a radial direction only by a rotor hub. In addition, an input plate connected to the input member is spline-coupled to the input member and cannot be supported in the axial direction. This causes an unstable axial balance of the input member and abrasion of a tooth part.

The input member disclosed in Patent Document 2 is supported in a radial direction and an axial direction by a hub ridge but supported only by the hub ridge. A radial support element and an axial support element are separately provided, which causes a complicated manufacturing process. In addition, because the hub ridge itself is a component that is not integrated with the rotor hub, an axial balance of the input member supported on the component is inevitably unstable.

The input member disclosed in Patent Document 3 is supported in a radial direction and an axial direction by a housing but supported only by the housing, and thus an axial balance of the input member is unstable.

The input member disclosed in Patent Document 4 is spline-coupled to a rotor hub and connected directly to a front cover of a torque converter positioned at an output side. Therefore, the structure cannot regulate an output of an engine.

The input member of the hybrid driving module, which may allow or cut off the transmission of the output of the engine to the rotor hub with the engine clutch interposed between the rotor hub and the input member, is supported on any one component such as the rotor hub, the hub ridge, or the housing, which makes it difficult to ensure the axial balance. If the input member is configured to be supported and aligned on two or more components, the assembling process becomes very complicated, and the number of components significantly increases. In addition, if the input member is not supported in the axial direction, there is a problem in that the tooth part existing between the engine clutch and the input member is abraded or damaged.

DISCLOSURE

Technical Problem

The present invention has been made in an effort to solve the above-mentioned problems, and an object of the present invention is to provide a hybrid driving module, in which an input member may be supported by a rotor hub.

Another object of the present invention is to provide a hybrid driving module, in which an input member may be supported in an axial direction by a rotor hub.

Still another object of the present invention is to provide a hybrid driving module, in which an input member may be rotatably supported by two or more components.

Yet another object of the present invention is to provide a hybrid driving module which has a structure in which an input member is rotatably supported by two or more components, and in which an increase in number of components is minimized, and an assembling process is simplified.

Technical Solution

To achieve the above-mentioned object, the present invention provides a hybrid driving module, in which an input member is aligned at least in a radial direction by a central shaft extension part of a rotor hub.

The input member may also be aligned in an axial direction by the central shaft extension part.

A bearing configured to support a rotation and thrust may be installed between the central shaft extension part and the input member.

According to the structure in which the input member is supported on and aligned with the central shaft extension part, a structure in which an outer peripheral surface of the input member may be rotatably supported on another component may be easily added, the assembling process may be easily performed, and an increase in number of components may be suppressed.

The input member may be supported to be rotatable relative to a housing. The input member may be aligned in the radial direction and/or the axial direction by the housing.

Because the input member is supported and aligned by the rotor hub and supported and aligned by the housing independently of the rotor hub, the stable axial balance may be ensured.

The rotor hub may have a hub ridge. The hub ridge may be aligned in the radial direction and/or the axial direction by the housing.

The hub ridge may be directly supported and aligned by the housing and indirectly supported and aligned with the input member by the rotor hub.

A portion where the housing supports the input member and the hub ridge is disposed between the input member and the hub ridge in the radial direction, such that the assembling process may be very easily performed.

The engine clutch of the hybrid driving module may be disposed between the input member and the rotor hub. Because the input member is supported in the axial direction, it is possible to prevent abrasion of and damage to a driving system between the input member and the engine clutch.

Specifically, a hybrid driving module according to the present invention includes: a motor 40 including a stator 41 and a rotor 42; a rotor hub 43 configured to support the rotor 42 and rotate integrally with the rotor 42; and an input member 10 axially aligned with the rotor hub 43 and configured to be rotatable relative to the rotor hub 43, the input member 10 being disposed axially forward of the rotor hub 43 and configured to receive an output of an engine.

The rotor hub 43 may include: a rotor holder 44 configured to support the rotor 42; a hub plate 45 connected to the rotor holder 44 and extending radially from the rotor holder 44; and a central shaft extension part 450 extending axially forward from a rotation center of the hub plate 45.

A rear end of the input member 10 may be aligned in the radial direction and/or the axial direction by the central shaft extension part 450 of the rotor hub 43.

A third bearing B3 may be interposed between the input member 10 and the central shaft extension part 450. A third bearing B3 may align the input member 10 with the central shaft extension part 450 in the radial direction and/or the axial direction.

In the first embodiment, the input member 10 may have a cylindrical outer input shaft 111 extending backward from a rear end thereof and having a hollow portion opened backward. The central shaft extension part 450 may have an inner hub shaft 451 extending forward and accommodated in a hollow portion of the outer input shaft 111. A third bearing B3 may be interposed between an inner peripheral surface of the outer input shaft 111 and an outer peripheral support surface 452 of the inner hub shaft 451.

An external stepped portion 453 having an increased diameter may be provided at a rear side of the outer peripheral support surface 452 of the inner hub shaft 451, an inner race B32 of the third bearing B3 may be supported in the axial direction by the external stepped portion 453, an internal support stepped portion 112 having a decreased inner diameter may be provided at a front side of the inner peripheral surface of the outer input shaft 111, and an outer race B31 of the third bearing B3 may be supported in the axial direction by the internal support stepped portion 112.

In the second embodiment, the central shaft extension part 450 may have a cylindrical outer hub shaft 454 extending forward and having a hollow portion opened forward. The input member 10 may have an inner input shaft 113 extending backward from a rear end thereof and accommodated in a hollow portion of the outer hub shaft 454. A third bearing B3 may be interposed between an inner peripheral support surface 455 of the outer hub shaft 454 and an outer peripheral surface of the inner input shaft 113.

An internal stepped portion 456 having a decreased inner diameter may be provided at a rear side of the inner peripheral support surface 455 of the outer hub shaft 454, an outer race B31 of the third bearing B3 may be supported in the axial direction by the internal stepped portion 456, an external support stepped portion 114 having an increased diameter may be provided at a front side of the outer peripheral surface of the inner input shaft 113, and an inner race B32 of the third bearing B3 may be supported in the axial direction by the external support stepped portion 114.

The hybrid driving module may further include a housing 80 configured to support the stator 41.

A radial inner end of the housing 80 may be disposed radially outside the input member 10.

The input member 10 may be aligned in the radial direction and/or the axial direction by the radial inner end of the housing 80.

A first axial position at which the input member 10 is aligned in the radial direction by the central shaft extension part 450 may be different from a second axial position at which the input member 10 is aligned in the radial direction by the housing 80.

The second axial position may be disposed forward of the first axial position.

A first bearing B1 may be interposed between the input member 10 and the radial inner end of the housing 80, the input member 10 may have a bearing stepped portion 103 configured to support a rear end of the first bearing B1, an insert groove 101 extending in an annular shape in a circumferential direction may be provided on an outer peripheral surface of the input member 10, and a bearing snap ring 13 inserted into the insert groove 101 may support a front end of the first bearing B1.

A hub ridge 46 extending radially inward may be connected to a front end of the rotor holder 44. The hub ridge 46 may be coupled to the rotor hub 43 so that a rotation thereof is restricted. The hub ridge 46 may be aligned in the radial direction and/or the axial direction by the radial inner end of the housing 80.

The radial inner end of the housing 80 may be disposed between the hub ridge 46 and the input member 10 in the radial direction. An outer peripheral surface of the radial inner end of the housing 80 may support the hub ridge 46, and an inner peripheral surface of the radial inner end of the housing 80 may support the input member 10.

The hybrid driving module may further include an input plate 12 connected to the input member 10 at a rear end of the input member 10. The input plate 12 may extend radially outward from the input member 10 and rotate integrally with the input member 10.

The hybrid driving module may further include an engine clutch 20 disposed radially inside the rotor holder 44 and disposed in a space corresponding to an axial front side of the hub plate 45. The engine clutch 20 may control whether to transmit power between the input plate 12 and the rotor hub 43. Because the input plate 12 is aligned in position in the axial direction by the rotor hub 43, there is no concern that abrasion or damage occurs between the engine clutch 20 and the input plate 12.

The hub ridge 46 is provided forward of the rotor holder 44, and a first piston plate 21 configured to press or release the engine clutch 20 in the axial direction may be installed on the hub ridge 46 so as to be slidable in the axial direction.

The hub ridge 46 may be disposed forward of the engine clutch 20 including a first clutch pack 22.

A first carrier 23 of the engine clutch 20 may be fixed to the rotor hub 43.

The first piston plate 21 may be disposed between the first clutch pack 22 and the hub ridge 46.

The hub ridge 46 may be disposed axially forward of the hub plate 45.

An output member 70 may be disposed axially backward of the hub plate 45 and transmit power of the hybrid driving module to the transmission.

Advantageous Effects

According to hybrid driving module according to the present invention, the input member is supported by the rotor hub, such that it is possible to prevent abrasion and damage caused by a relative motion between the input member and the engine clutch installed between the input member and the rotor hub.

In addition, according to the present invention, the input member is supported by the central shaft extension part of the rotor hub, such that an additional support structure between the input member and another component may be easily implemented, the assembling process may be easily performed, and an increase in number of components may be minimized.

In addition, according to the present invention, it is possible to more stably ensure the axial balance of the input member.

The specific effects of the present invention, together with the above-mentioned effects, will be described along with the description of specific items for carrying out the present invention.

DESCRIPTION OF MAIN REFERENCE NUMERALS OF DRAWINGS

Figure 1:
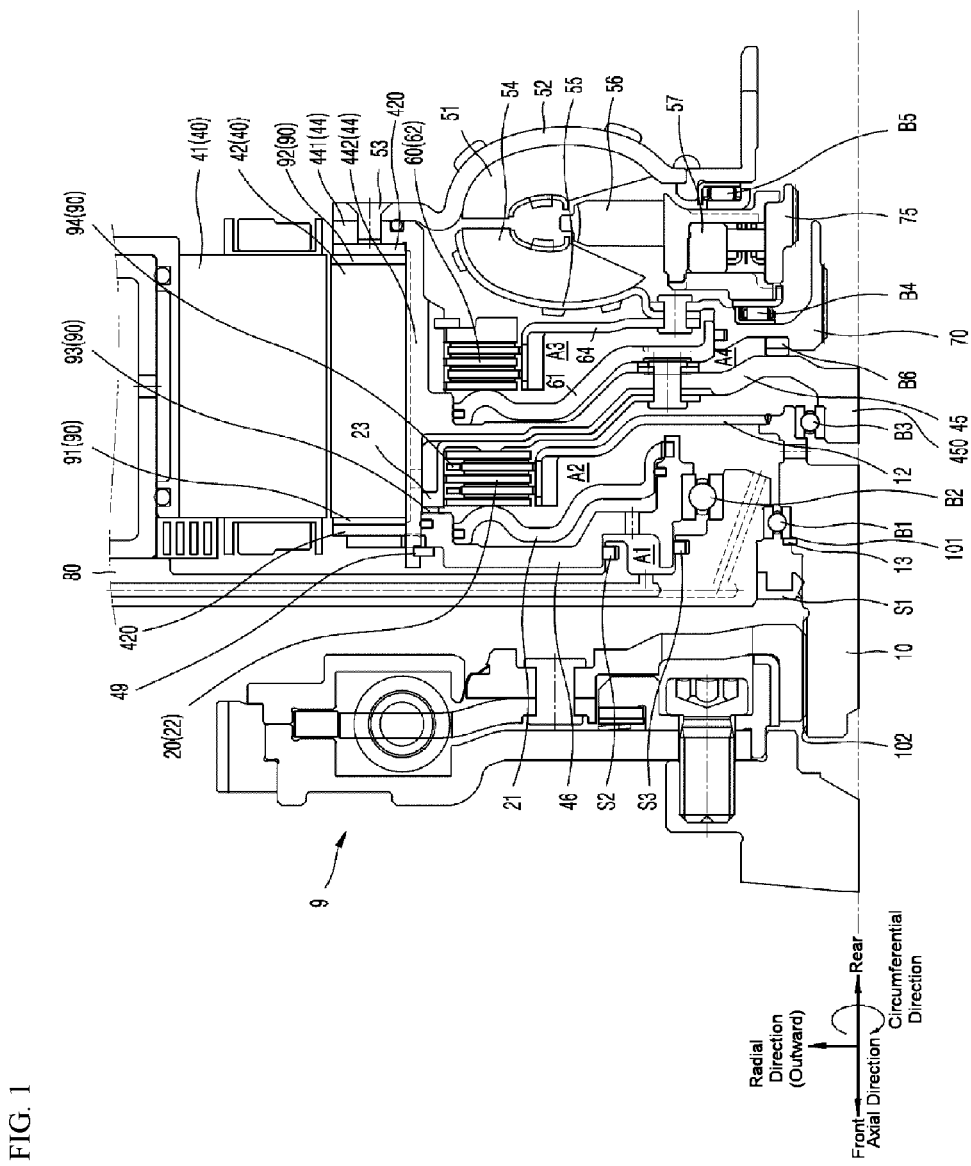
FIG. 1 is a conceptual view of a first embodiment of a hybrid driving module according to the present invention.

9: Spring damper
10: Input member
101: Insert groove
102: Spline
103: Bearing stepped portion
111: Outer input shaft
112: Internal support stepped portion
113: Inner input shaft
114: External support stepped portion
12: Input plate
13: Bearing snap ring
20: Engine clutch
21: First piston plate
22: First clutch pack
23: First carrier
40: Motor
41: Stator
42: Rotor
420: Retainer
43: Rotor hub
44: Rotor holder
441: Radial support portion
442: Axial support portion
443: Spline shape portion
4433: Snap groove
444: Spline groove
45: Hub plate
450: Central shaft extension part
451: Inner hub shaft
452: Outer peripheral support surface
453: External stepped portion
454: Outer hub shaft
455: Inner peripheral support surface
456: Internal stepped portion
46: Hub ridge
460: Hub coupling portion
461: Fitting portion
462: Radius extension portion
463: Accommodation groove
464: Piston installation portion
465: Radial outer-inner peripheral surface
466: Radial inner-outer peripheral surface
467: Flow hole
468: Slide protrusion
49: Ridge snap ring (ridge fixing member)
50: Fluid clutch
51: Impeller
52: Back cover
53: Bolt
54: Turbine
55: Turbine plate
56: Reactor
57: One-way clutch
60: Lock-up clutch
61: Second piston plate
62: Second clutch pack
64: Output plate
70: Output member
75: Fixed end
80: Housing
90: Elastic body
91: First elastic body
92: Second elastic body
93: Third elastic body
94: Fourth elastic body
S1, S2, S3: Sealing member
B1, B2, B3, B4, B5, B6: Bearing
B31: Outer race
B32: Inner race
B33: Rolling element (ball)
A1, A2, A3, A4: Space

MODE FOR INVENTION

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a hybrid driving module according to an embodiment is symmetrical with respect to an axis, only the half of the hybrid driving module based on the axis is illustrated for the convenience of illustration. In addition, for the convenience of description, a direction along a longitudinal direction of an axis defining a center of a rotation of the hybrid driving module is defined as an axial direction. That is, a forward/backward direction or an axial direction is defined as a direction parallel to a rotation axis. A front (forward) means any one direction of a power source, e.g., a direction toward an engine. A rear (backward) means the other direction, e.g., a direction toward a transmission. Therefore, a front surface means a surface facing forward, and a rear surface means a surface facing backward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

[Hybrid Driving Module]

Hereinafter, a structure of a hybrid driving module according to an embodiment will be described with reference to FIGS. 1 to 6.

The hybrid driving module according to the embodiment includes an input member 10 connected to an output side of an engine and configured to receive an output of the engine, and an output member 70 configured to transmit driving power of a motor or driving power of the motor and the engine to a transmission.

The output of the engine is inputted to the input member 10 via a spring damper 9. The spring damper 9 engages with a spline 102 of the input member 10, and a mutual rotation thereof is restricted. The spring damper 9 mitigates fluctuation of the output of the engine to suppress the occurrence of vibration.

The spline 102 is provided on an outer peripheral surface of an axial front side of the input member 10. Further, an input plate 12 extending outward in a radial direction is connected to an outer peripheral surface of an axial rear side of the input member 10. The input plate 12 is integrally fixed to the input member 10 by welding or the like and rotates integrally with the input member 10.

An engine clutch 20 is connected to a radial outer end of the input member 10. The engine clutch 20 is provided between a rotor hub 43 and the input member 10 and transmits or does not transmit the output of the engine to the rotor hub 43.

The hybrid driving module includes a motor 40. The motor 40 includes an annular stator 41, and an annular rotor 42 disposed at a radial inner side of the stator 41. The rotor 42 is rotated by an electromagnetic interaction with the stator 41.

The stator 41 is fixed to a housing 80. The housing 80 is disposed forward of the motor 40 in the axial direction and extends in the radial direction. The input member 10 is rotatably supported at a radial inner end of the housing 80 by a first bearing B1. The first bearing B1 is fixed in the axial direction by a bearing snap ring 13 fitted into an insert groove 121 provided in an outer peripheral surface of the input member 10. An axial rear side of an inner race of the first bearing B1 is supported by a bearing stepped portion 122 of the input member 10, and an axial front side of the inner race of the first bearing B1 is supported by the bearing snap ring 13. An outer race of the first bearing B1 is supported in the axial direction and the radial direction by the housing 80. Therefore, the input member 10 is supported in the radial direction and the axial direction with respect to the housing 80 by the first bearing B1.

A first sealing member S1 configured to seal a fluid in the housing is provided between the input member 10 and the housing 80.

The rotor 42 is fixed to the rotor hub 43. The rotor hub 43 includes a rotor holder 44 configured to fix the rotor 42, and a hub plate 45 extending radially inward from the rotor holder 44.

The rotor holder 44 includes a radial support portion 441 configured to support an inner peripheral surface of the rotor 42, and an axial support portion 442 configured to support an axial rear end of the rotor 42. The radial support portion 441 may have a cylindrical shape extending in the axial direction. The axial support portion 442 may have a shape extending outward in the radial direction from the axial rear end of the radial support portion 441.

The radial support portion 441 supports an inner peripheral surface of the rotor 42, and the axial support portion 442 supports an axial rear end of the rotor 42. The axial support portion 442 extending in the radial direction is not formed at a front end of the radial support portion 441. Therefore, the rotor 42 is externally inserted from the front side to the rear side in the axial direction, such that an inner peripheral surface of the rotor 42 is supported to face an outer peripheral surface of the radial support portion 441, and an axial rear end of the rotor 42 is supported to face a front surface of the axial support portion 442.

A plurality of spline shape portions 443 is provided at an axial front side of the radial support portion 441. The spline shape portion 443 further extends from an axial front end to an axial front side of the radial support portion 441. The spline shape portion 443 has a shape made by extending a curved surface of the radial support portion 441. That is, an outer peripheral surface and an inner peripheral surface of the spline shape portion 443 may respectively have shapes made by extending an outer peripheral surface and an inner peripheral surface of the radial support portion 441. Therefore, the spline shape portion 443 does not hinder a process in which the rotor 42 is fitted with an outer peripheral side of the radial support portion 441 and a process in which a first carrier 23 of the engine clutch 20 is fitted with an inner peripheral side of the radial support portion 441. The plurality of spline shape portions 443 have the same width in the circumferential direction and are disposed at equal intervals.

Spline grooves 444 are provided between the plurality of spline shape portions 443. The plurality of spline grooves 444 have the same width and the same depth in an axially backward direction. The spline shape portions 443 and the spline grooves 444 may be formed by forming grooves at equal intervals in the circumferential direction at a front end of the cylindrical radial support portion 441.

Snap grooves 4433 are formed in inner peripheral surfaces of the plurality of spline shape portions 443 and disposed on the same plane perpendicular to the axial direction. The snap groove 4433 has a shape extending in the circumferential direction from the inner peripheral surface of the spline shape portion 443. An interval between an axial rear end of the snap groove 4433 and an axial rear end of the spline groove 444 corresponds to an axial thickness of a fitting portion 461 of a hub ridge 46 to be described below. The snap groove 4433 is a groove into which a ridge fixing member, i.e., a ridge snap ring 49 is fitted to prevent the hub ridge 46 from separating axially forward after the fitting portion 461 of the hub ridge 46 is fitted into the spline groove 444.

The hub plate 45 is connected to the rotor holder 44 in the vicinity of an axial central portion of the radial support portion 441. The hub plate 45 extends radially inward from an inner peripheral surface of the radial support portion 441 and has a shape similar to a disk. A central shaft extension part 450 extending forward is provided on a central portion of a radius of the hub plate 45, and the central shaft extension part 450 is supported to be relatively rotatable by means of the input member 10 and the third bearing B3. The third bearing B3 supports the input member 10 in the axial direction and the radial direction with respect to the central shaft extension part 450 of the hub plate 45.

The input plate 12 and the engine clutch 20 are disposed in a space disposed forward of the hub plate 45. The engine clutch 20 includes a first clutch pack 22 having a friction plate or a friction member. The first carrier 23 of the engine clutch 20 is connected to the rotor hub 43 so that the rotation of the first carrier 23 is restricted. The first clutch pack 22 is disposed between the input plate 12 and the first carrier 23.

A first piston plate 21 is disposed at the axial front side of the first clutch pack 22. When the first piston plate 21 presses the first clutch pack 22 in the axial direction, the input plate 12 and the first carrier 23 are connected so that the mutual rotations thereof are restricted. Therefore, the output of the engine transmitted to the input plate 12 may be transmitted to the rotor hub 43 via the engine clutch 20. When the first piston plate 21 does not press the first clutch pack 22, the mutual rotations of the input plate 12 and the first carrier 23 are not restricted. Therefore, the output of the engine is transmitted only to the input plate 12 without being transmitted to the rotor hub 43.

Figure 5:
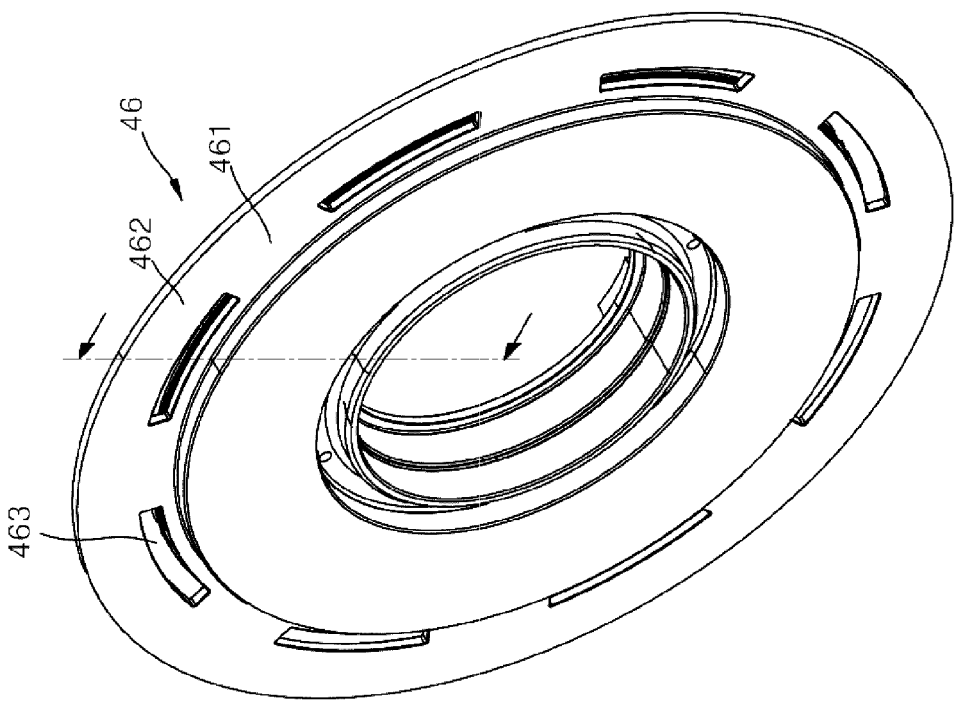
FIG. 5 is a perspective view illustrating a hub ridge.
Figure 4:
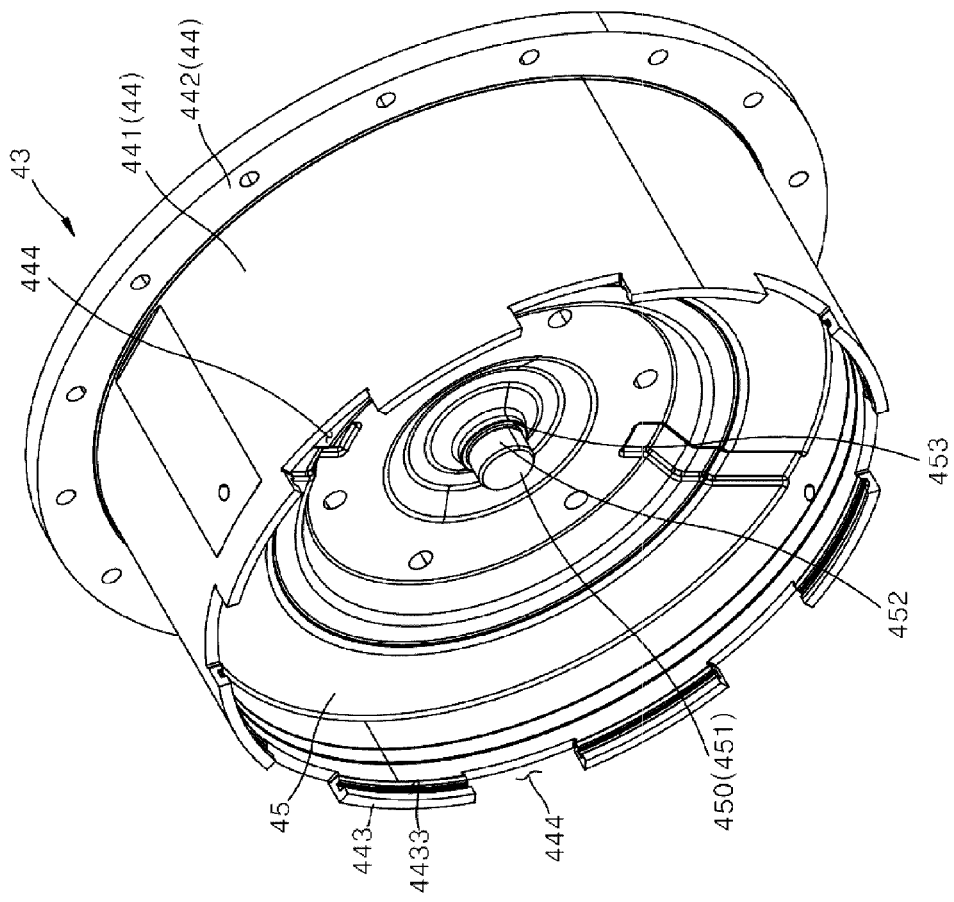
FIG. 4 is a perspective view illustrating a rotor hub.
Figure 7:
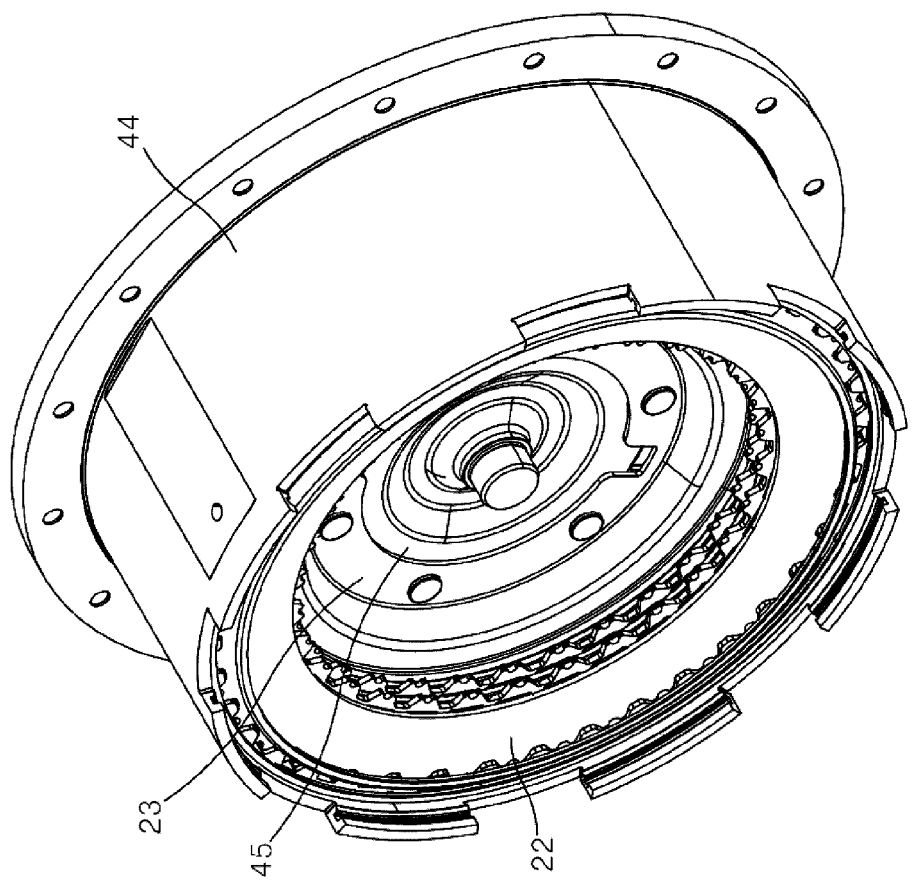
FIG. 7 is a perspective view illustrating a state in which an engine clutch is installed on the rotor hub in FIG. 4.
Figure 6:
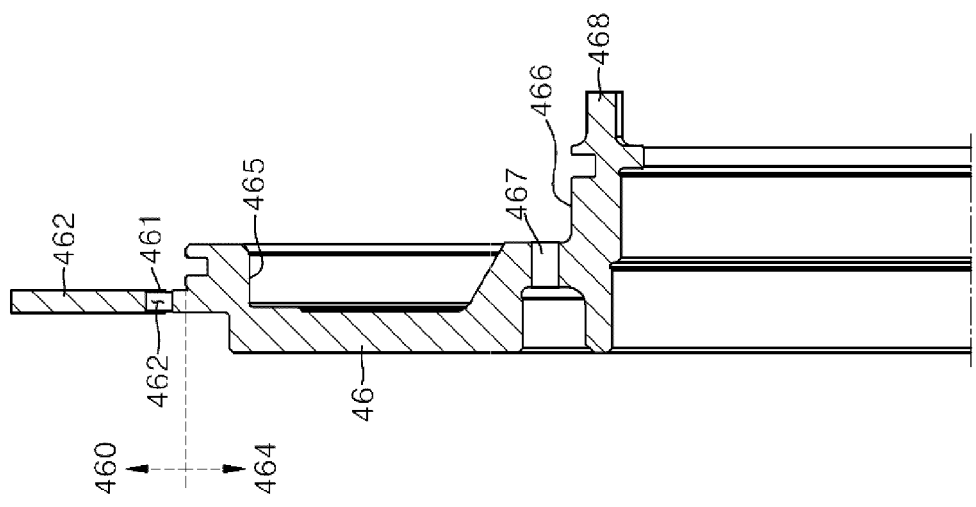
FIG. 6 is a view illustrating a cross-section of an arrow part in FIG. 5.

The hub ridge is disposed at an axial front side of the first piston plate 21. Referring to FIG. 5, the hub ridge 46 may be an approximately disk or circular disk-shaped member opened at a center side thereof and extending in the radial direction. The hub ridge 46 includes a piston installation portion 464, and a hub coupling portion 460 provided at a radial outer side of the piston installation portion 464. The hub coupling portion 460 is connected to the rotor holder 44 so that the rotation thereof is restricted.

The first piston plate 21 of the engine clutch 20 is installed at an axial rear side of the piston installation portion 464. The piston installation portion 464 has a radial outer-inner peripheral surface 465 extending backward from the radial outer end in the axial direction, and a radial inner-outer peripheral surface 466 extending backward from the radial inner end in the axial direction. An outer peripheral surface of a radial outer end of the first piston plate 21 adjoins the radial outer-inner peripheral surface 465 so as to be slidable in the axial direction. An inner peripheral surface of a radial inner end of the first piston plate 21 adjoins the radial inner-outer peripheral surface 466 so as to be slidable in the axial direction.

A flow hole 467 is provided in the piston installation portion 464 so that the fluid may be introduced into the space defined by the first piston plate 21, a rear surface of the piston installation portion 464, the radial outer-inner peripheral surface 465, and the radial inner-outer peripheral surface 466.

In addition, a slide protrusion 468 extending axially backward is provided on the piston installation portion 464. The slide protrusion 468 may be provided in the vicinity of the radial inner-outer peripheral surface 466. The first piston plate 21 has a slide groove having a shape complementary to the slide protrusion 468. Therefore, the first piston plate 21 may slide in the axial direction in the state in which the rotation thereof is restricted by the hub ridge 46.

A radial inner side of the hub ridge 46 is rotatably connected to the housing 80. To this end, a second bearing B2 is interposed between an inner peripheral surface of a radial inner side of the hub ridge 46 and an outer peripheral surface of a radial inner side of the housing 80. An outer race of the second bearing B2 supports the hub ridge 46 in the radial direction and the axial direction. An inner race of the second bearing B2 supports the housing 80 in the radial direction and the axial direction. Therefore, the hub ridge 46 is supported on the housing 80 in the radial direction and forward in the axial direction.

The hub ridge 46 rotates relative to the housing 80, and an annular second sealing member S2 and a third sealing member S3 are installed between the hub ridge 46 and the housing 80 and seal the fluid.

The first piston plate 21 extends in the radial direction. An outer peripheral surface of a radial outer side of the first piston plate 21 and an inner peripheral surface of a radial outer side of the hub ridge 46 face each other and slidably adjoin each other in the axial direction. An inner peripheral surface of a radial inner side of the first piston plate 21 and an outer peripheral surface of a radial inner side of the hub ridge 46 face each other and slidably adjoin each other in the axial direction.

Figure 14:
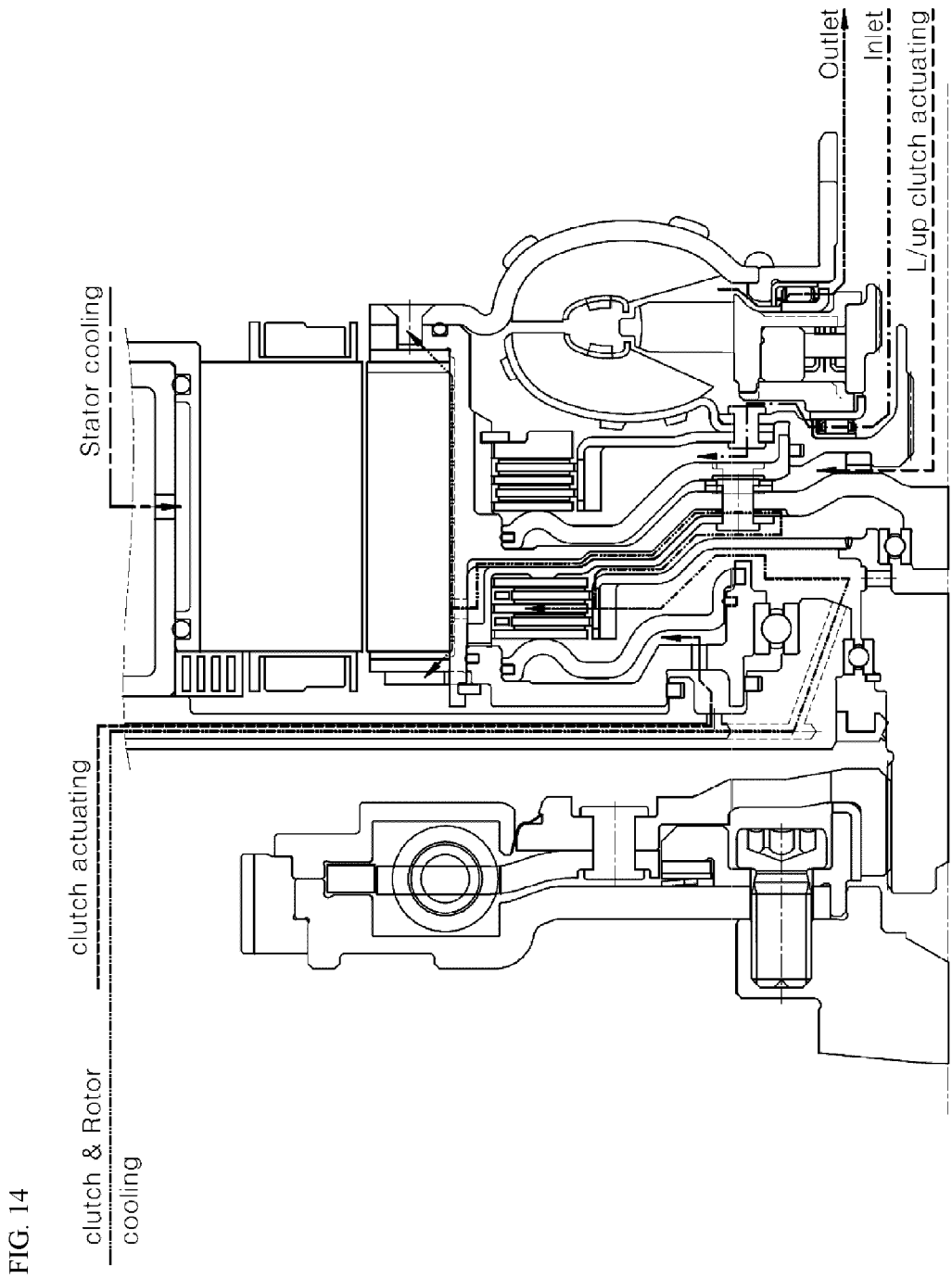
FIG. 14 is a view illustrating a flow control direction of a fluid in FIG. 1.

As illustrated in FIG. 14, when the fluid is introduced into the front space A1 of the first piston plate 21 through the housing 80, the first piston plate 21 moves axially backward relative to the hub ridge 46 and presses the first clutch pack 22.

As illustrated in FIG. 14, when the fluid is introduced into the rear space A2 of the first piston plate 21 through the housing 80, the first piston plate 21 moves axially forward relative to the hub ridge 46 and does not press the first clutch pack 22.

The hub ridge 46 may be installed on the rotor hub 43 in the state in which the first piston plate 21 is installed on the hub ridge 46. The hub coupling portion 460 is provided at the radial outer side of the piston installation portion 464 and serves as a structure for assembling the hub ridge 46 to the rotor hub 43.

The hub coupling portion 460 of the hub ridge 46 further extends outward in the radial direction than the radial support portion 441 of the rotor holder 44. A rear surface of a radial outer end of the hub ridge 46 supports an axial front side of the rotor 42.

The hub coupling portion 460 has the plurality of fitting portions 461 extending radially outward from the piston installation portion 464 and inserted into the plurality of spline grooves 444. The fitting portion 461 interferes with the spline shape portion 443 in the circumferential direction so that the rotations of the hub ridge 46 and the rotor hub 43 are restricted.

The hub coupling portion 460 has a radius extension portion 462 further extending radially outward from the fitting portion 461. The radius extension portion 462 is a portion further protruding radially outward than the radial support portion 441 in the state in which the hub ridge 46 is installed on the rotor hub 43.

The radius extension portion 462 supports an axial front end of the rotor 42. That is, the radius extension portion 462 and the axial support portion 442 support the rotor 42 interposed therebetween in the axial direction.

An accommodation groove 463 is provided between the plurality of fitting portions 461. The spline shape portion 443 of the rotor hub 43 is inserted into the accommodation groove 463. The radius extension portion 462 may be a ring shape connected in the circumferential direction. Then, the accommodation groove 463 may have a hole shape closed in the circumferential direction and the radial direction and penetrated in the axial direction.

From another standpoint, the hub coupling portion 460 may be a ring-shaped portion extending radially from a radial outer end of the piston installation portion 464. The ring-shaped portion has a plurality of accommodation grooves 463 into which the plurality of spline shape portions 443 is respectively inserted. The accommodation groove 463 may be a through-hole having an arc shape. Further, the portions disposed between the plurality of accommodation grooves 463 in the circumferential direction may constitute the fitting portions 461 fitted into the spline grooves 444. Therefore, the portion of the hub coupling portion 460, which is disposed radially outside the accommodation groove 463 and the fitting portion 461, may constitute the radius extension portion 462 further extending radially outward than the radial support portion 441.

Retainers 420 may be installed at an axial front side and an axial rear side of the rotor 42 and protect and support the rotor 42. An outer end of the hub ridge 46 may adjoin the retainer 420.

A ridge snap ring 49 is fitted with and fixed to the inner peripheral surface of the radial support portion 441 and prevents the hub ridge 46 from separating axially forward.

According to the structure of the hub ridge 46 described above, the first piston plate 21 is installed and the radius extension portion 462 of the hub ridge 46 fixes the rotor 42 during the process in which the hub ridge 46 is installed on the rotor hub 43. From another standpoint, it can be said that the rotor 42 restricts the axially backward movement of the hub ridge 46.

That is, the axially forward separation of the hub ridge 46 may be restricted by the ridge snap ring 49, and the axially backward movement of the hub ridge 46 may be restricted by the axial rear end of the spline groove 444 and/or the rotor 42.

The hub ridge 46 may have an axial clearance occurring between the ridge snap ring 49 and the axial rear end of the spline groove 444 because of a processing deviation of the spline groove 444 and a thickness deviation of the hub ridge 46. That is, the hub ridge 46 may vibrate by moving in the axial direction, which may cause noise.

Therefore, the hybrid driving module may further include an elastic body 90 configured to elastically press the hub ridge 46 axially forward and push the hub ridge 46 toward the ridge snap ring 49.

The elastic body 90 may be installed at any position as long as the elastic body 90 at that position may appropriately push the hub ridge 46 toward the ridge snap ring 49. FIG. 1 illustrates a structure in which first to fourth elastic bodies 91, 92, 93, and 94 are installed at different positions and press the hub ridge 46 toward the ridge snap ring 49. However, this configuration is provided for the convenience of description, and the elastic body 90 may include only any one of the first to fourth elastic bodies 91, 92, 93, and 94. Of course, the elastic body 90 may include two or more elastic bodies 90 among the first to fourth elastic bodies 91, 92, 93, and 94.

Figure 3:
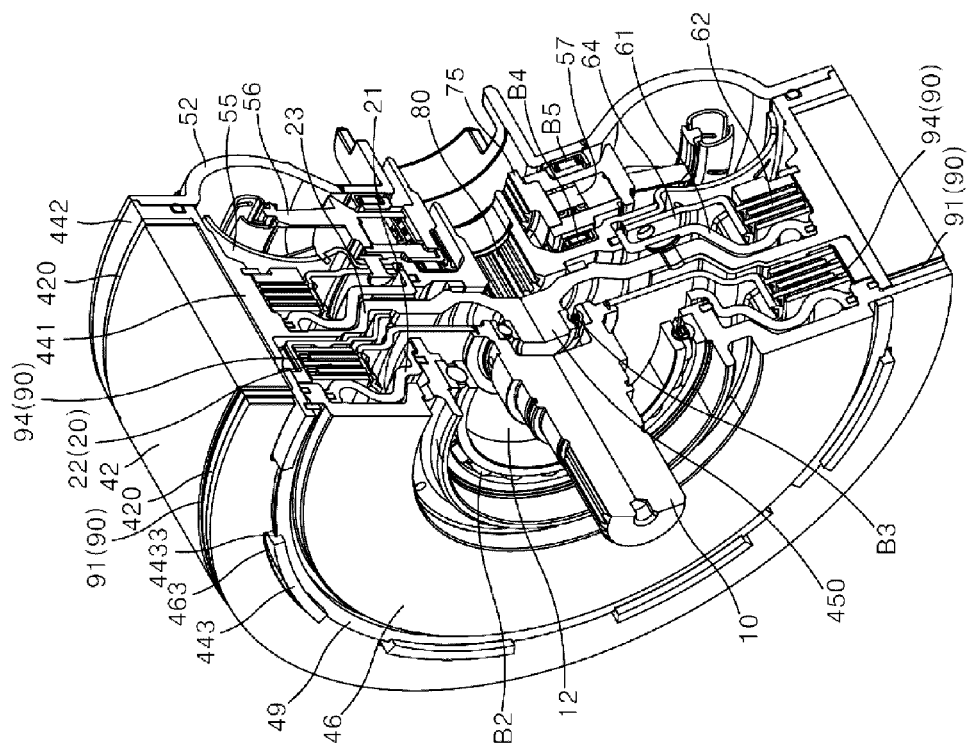
FIG. 3 is a cross-sectional perspective view of FIG. 2.
Figure 2:
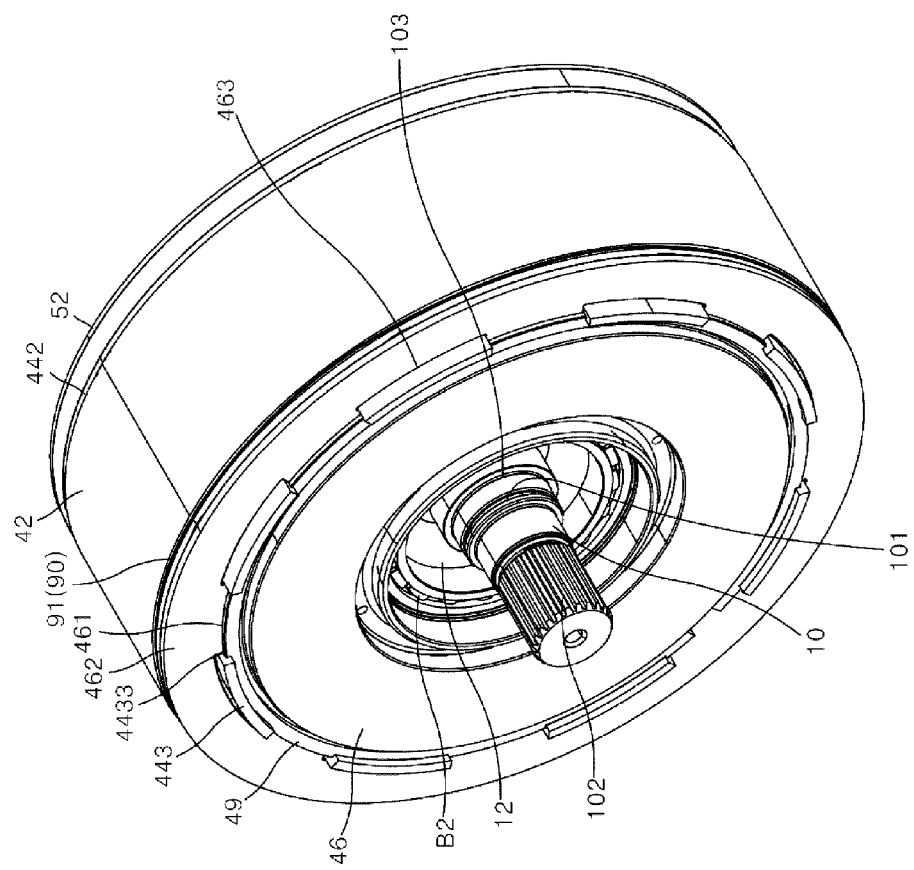
FIG. 2 is a perspective view illustrating the hybrid driving module in FIG. 1 in a state in which a spring damper, a stator of a motor, and a housing are not illustrated.

First, the elastic body 90 may be configured to elastically press the radius extension portion 462 forward from the rotor 42 and push the hub ridge 46 toward the ridge snap ring 49. The first elastic body 91 and the second elastic body 92 illustrated in FIG. 1 correspond to this configuration. For reference, FIG. 3 illustrates that only the first elastic body 91 between the first elastic body 91 and the second elastic body 92 is applied, and the second elastic body 92 is not applied.

The first elastic body 91 may be interposed between the radius extension portion 462 and the front end of the rotor 42. The second elastic body 92 may be interposed between the rear end of the rotor 42 and the axial support portion 442. FIG. 1 illustrates an example in which the first elastic body 91 is disposed on the retainer 420 and the front end of the rotor 42, and the second elastic body 92 is disposed between the rear end of the rotor 42 and the retainer 420. However, the first elastic body 91 and the second elastic body 92 may of course be disposed further axially outward than the retainer 420 based on the rotor 42.

The first elastic body 91 and/or the second elastic body 92 may provide an elastic force in a direction in which the first elastic body 91 and/or the second elastic body 92 is expanded in the axial direction. Therefore, the hub ridge 46 is pressed against the ridge snap ring 49 by the first elastic body 91 and/or the second elastic body 92, and thus the hub ridge 46 does not vibrate or rattle. In addition, the rotor 42 may also be securely supported in the axial direction between the axial support portion 442 and the radius extension portion 462.

Next, the elastic body 90 may be configured to elastically press the piston installation portion 464 forward from the engine clutch 20 and push the hub ridge 46 toward the ridge snap ring 49. The third elastic body 93 and the fourth elastic body 94 illustrated in FIG. 1 correspond to this configuration. For reference, FIG. 3 illustrates that only the fourth elastic body 94 between the third elastic body 93 and the fourth elastic body 94 is applied, and the third elastic body 93 is not applied.

The engine clutch 20 is installed in a space disposed radially inside the radial support portion 441 and corresponding to the axial front side of the hub plate 45. The engine clutch 20 includes the first clutch pack 22 and the first carrier 23. The first carrier 23 may be installed on the hub plate 45 of the rotor hub 43. The first carrier 23 rotates integrally with the rotor hub 43. A radial outer side of the first clutch pack 22 is connected to the first carrier 23, and a radial inner side of the first clutch pack 22 is connected to the input member 10. Clutch plates connected to the first carrier 23 and clutch plates connected to the input member 10 are alternately disposed, and friction members are interposed between the clutch plates.

A radial outer peripheral surface of the first carrier 23 and an outer peripheral surface provided at a radial outer side of the piston installation portion 464 of the hub ridge 46 face an inner peripheral surface of the radial support portion 441 of the rotor holder 44. A front end of the first carrier 23 faces a radial outer end of the piston installation portion 464 of the hub ridge 46.

The third elastic body 93 may be interposed between the front end of the first carrier 23 and the radial outer end of the piston installation portion 464 of the hub ridge 46. Further, the third elastic body 93 provides an elastic force that elastically restore the third elastic body 93 in a direction in which the third elastic body 93 expands in the axial direction. Therefore, the first carrier 23 and the hub ridge 46 are elastically pressed by the third elastic body 93 in a direction in which the first carrier 23 and the hub ridge 46 move away from each other. Therefore, the hub ridge 46 is pushed against the ridge snap ring 49.

The fourth elastic body 94 may be installed on the first clutch pack 22. The fourth elastic body 94 may serve as a return spring for the first piston plate 21. The fourth elastic body 94 is disposed between the plurality of clutch plates and spreads the clutch plates in a direction in which the first clutch pack 22 is spread in the axial direction. The elastic force of the fourth elastic body 94 pushes the first piston plate 21 against the hub ridge 46. Then, the hub ridge 46 is elastically pressed against the ridge snap ring 49.

The elastic bodies 90, i.e., the first to fourth elastic bodies 91, 92, 93, and 94 may each be an annular disk spring or a wave washer. In the embodiment, the structure is described, in which the first to third elastic bodies 91, 92, and 93 are disk springs and the fourth elastic body 94 is a wave washer. However, the types of springs are not limited thereto.

A back cover 52 is fixed to the axial support portion 442 of the rotor holder 44 by bolts 53. The back cover 52 extends radially inward from the rotor holder 44. A radial inner end of the back cover 52 is connected to the transmission. An impeller 51 is provided on a front surface of the back cover 52.

The output member 70 is provided between the hub plate 45 and the back cover 52. A spline is formed on an inner peripheral surface of the output member 70 and connected to a non-illustrated input shaft of the transmission. The output member 70 is integrally connected to a turbine plate 55. The turbine plate 55 extends in the radial direction. A turbine 54 is provided on a rear surface of the turbine plate 55 and faces the impeller 51 in the axial direction.

A fixed end 75 is disposed between the back cover 52 and the output member 70. A spline is formed on an inner peripheral surface of the fixed end 75 and connected to a non-illustrated fixed shaft of the transmission.

A reactor 56 is disposed between the impeller 51 and the turbine 54. The reactor 56 is connected to the fixed end 75 through a one-way clutch 57. The impeller 51, the turbine 54, and the reactor 56 constitute a torque converter configured to boost torque of the motor 40 and transmit the torque to the output member 70.

The output member 70 is supported to be rotatable relative to the fixed end 75 by a fourth bearing B4. The back cover 52 is supported to be rotatable relative to the fixed end 75 by a fifth bearing B5. Further, the hub plate 45 and the output member 70 are supported to be rotatable relative to each other by a sixth bearing B6.

A lock-up clutch 60 is installed rearward of the hub plate 45 and provided on an inner peripheral surface of the rotor holder 44. An output plate 64 is integrally connected to the output member 70. The output plate 64 extends radially from the output member 70 to the lock-up clutch 60. The output plate 64 is rotated integrally with the output member 70.

The lock-up clutch 60 includes a second clutch pack 62 having a friction plate or a friction member. The second clutch pack 62 is disposed between the rotor hub 43 and the output plate 64.

A second piston plate 61 is disposed at an axial front side of the second clutch pack 62. When the second piston plate 61 presses the second clutch pack 62 in the axial direction, the rotor hub 43 and the output plate 64 are connected so that the mutual rotations thereof are restricted. Therefore, a rotational force of the rotor hub 43 may be transmitted to the output plate 64 and the output member 70 via the lock-up clutch 60. When the second piston plate 61 does not press the second clutch pack 62, the mutual rotations of the rotor hub 43 and the output plate 64 are not restricted. Therefore, a rotational force of the rotor hub 43 is transmitted to the output member 70 through the torque converter.

The second piston plate 61 extends in the radial direction. An outer peripheral surface of a radial outer side of the second piston plate 61 and the inner peripheral surface of the rotor holder 44 face each other and slidably adjoin each other in the axial direction. An inner peripheral surface of a radial inner side of the second piston plate 61 and an outer peripheral surface of the output member 70 face each other and slidably adjoin each other in the axial direction.

As illustrated in FIG. 14, when the fluid is introduced into a rear space A3 of the second piston plate 61 through the transmission, the second piston plate 61 moves axially forward relative to the rotor holder 44 and does not press the second clutch pack 62.

As illustrated in FIG. 14, when the fluid is introduced into a front space A4 of the second piston plate 61 through the transmission, the first piston plate 21 moves axially backward relative to the rotor holder 44 and presses the second clutch pack 62.

Figure 13:
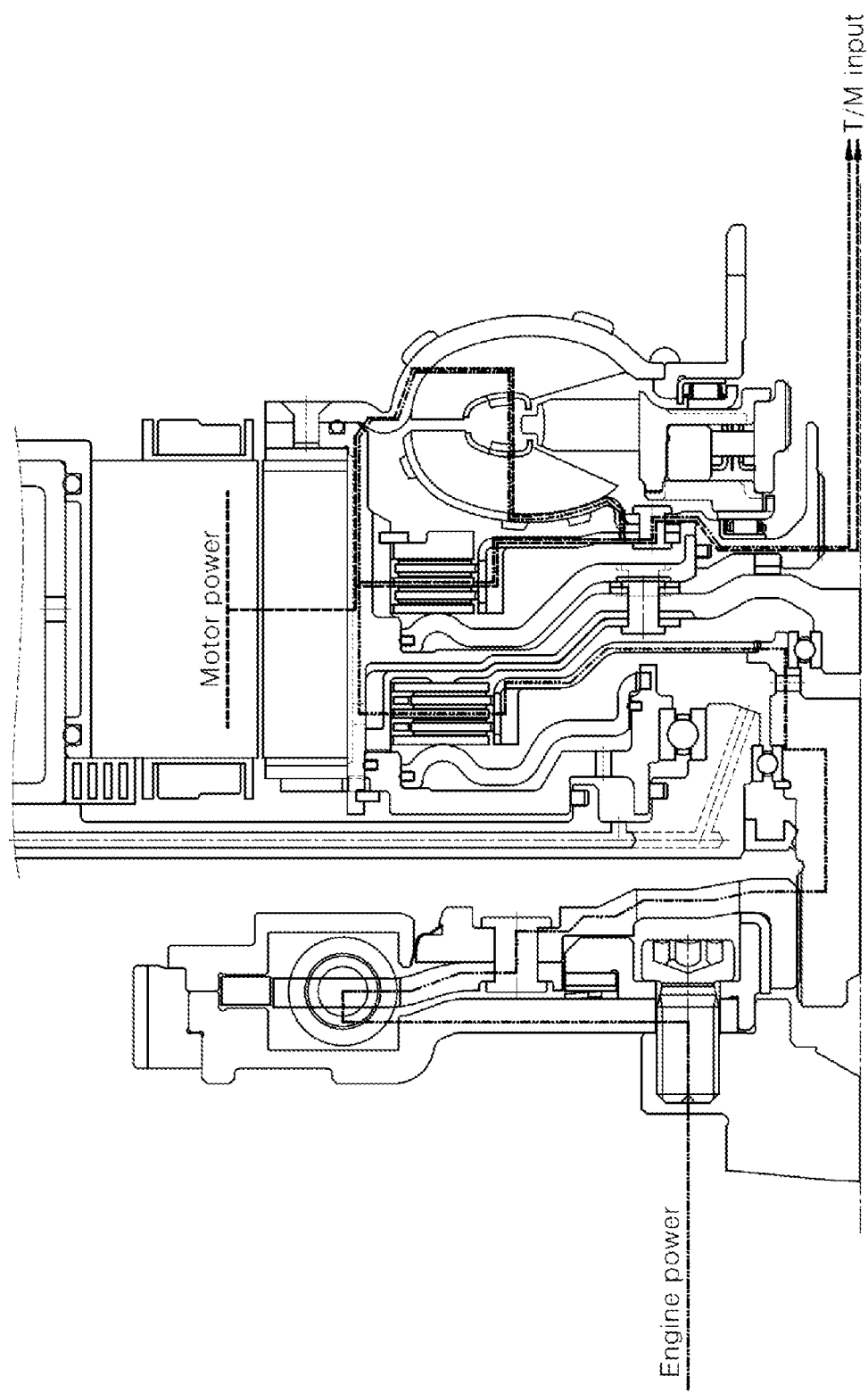
FIG. 13 is a view illustrating a transmission route of driving power in FIG. 1.

Hereinafter, a driving operation of the hybrid driving module will be described with reference to FIG. 13.

First, the engine clutch 20 does not transmit power between the input plate 12 and the first carrier 23 when the motor 40 provides driving power but the engine does not provide driving power. When it is necessary to boost torque of the motor 40 and transmit the torque to the transmission, i.e., when a rotational speed of the motor 40 is higher than a rotational speed of the output member 70, the torque of the motor 40 is boosted by the torque converter and transmitted to the output member 70. Therefore, when the rotational speed of the output member 70 becomes close to the rotational speed of the motor 40, the lock-up clutch 60 operates, and the rotor hub 43 and the output member 70 are connected directly to each other.

Meanwhile, when the engine provides driving power or when the engine and the motor 40 provide driving power, the engine clutch 20 transmits power between the input plate 12 and the first carrier 23. Then, the torque of the engine and the torque of the motor 40 are combined and transmitted to the output member 70 through the torque converter. The torque of the engine and the torque of the motor 40 may be boosted by the torque converter and transmitted to the output member 70. When a speed ratio (SR) between the rotor hub 43 and the output member 70 is 1:1, the rotor hub 43 and the output member 70 are connected directly to each other by the lock-up clutch 60.

According to the hybrid driving module according to the embodiment, the torque of the engine is transmitted to the rotor hub 43 through the input plate 12, the engine clutch 20, and the first carrier 23, and the hub ridge 46 is not in the torque transmission route.

[Input Member Support Structure]

A structure and process of installing the input member on the rotor hub will be described with reference to FIGS. 1 to 4 and 7 to 12.

The hub plate 45 of the rotor hub 43 according to the embodiment has a central shaft extension part 450 extending from the rotation center thereof to the front side in the axial direction. In the first embodiment illustrated in FIG. 1, the central shaft extension part 450 includes an inner hub shaft 451 having an outer peripheral support surface 452. An external stepped portion 453 is provided on the outer peripheral support surface 452 at the rear side in the axial direction and has a shape made by expanding a diameter of the inner hub shaft 451.

An outer input shaft 111 extending backward is provided at a rear end of the input member 10. The outer input shaft 111 may have the same structure as a hollow cylinder. Therefore, the inner hub shaft 451 may be accommodated in a hollow portion of the outer input shaft 111.

The input plate 12 is connected to an outer peripheral surface of the outer input shaft 111. In the state in which the inner hub shaft 451 is accommodated in the hollow portion of the outer input shaft 111, an inner peripheral surface of the outer input shaft 111 faces the outer peripheral support surface 452 of the inner hub shaft 451. An axial front side of the inner peripheral surface of the outer input shaft 111 has an internal support stepped portion 112 having a decreased inner diameter.

The third bearing B3 is installed between the outer input shaft 111 and the inner hub shaft 451 that face each other in the radial direction. The third bearing B3 includes an outer race B31, an inner race B32 disposed radially inside the outer race B31 and configured to rotate independently of the outer race B31, and rolling elements B33 such as balls disposed between the outer race B31 and the inner race B32 and configured to generate rolling friction while adjoining the outer race B31 and the inner race B32.

An inner peripheral surface of the inner race B32 of the third bearing B3 adjoins the outer peripheral support surface 452 of the inner hub shaft 451, and a rear surface of the inner race B32 of the third bearing B3 adjoins a front surface of the external stepped portion 453. Because the external stepped portion 453 is smaller than an inner diameter of the outer race B31, the external stepped portion 453 and the outer race B31 do not interfere with each other, even though the outer race B31 further moves backward than the inner race B32.

An outer peripheral surface of the outer race B31 of the third bearing B3 adjoins the inner peripheral surface of the outer input shaft 111, and a front surface of the outer race B31 of the third bearing B3 adjoins a rear surface of the internal support stepped portion 112 of the outer input shaft 111. Because an inner diameter of the internal support stepped portion 112 is larger than an outer diameter of the outer race B31, the internal support stepped portion 112 and the inner race B32 do not interfere with each other even though the inner race B32 further moves forward than the outer race B31.

Figure 11:
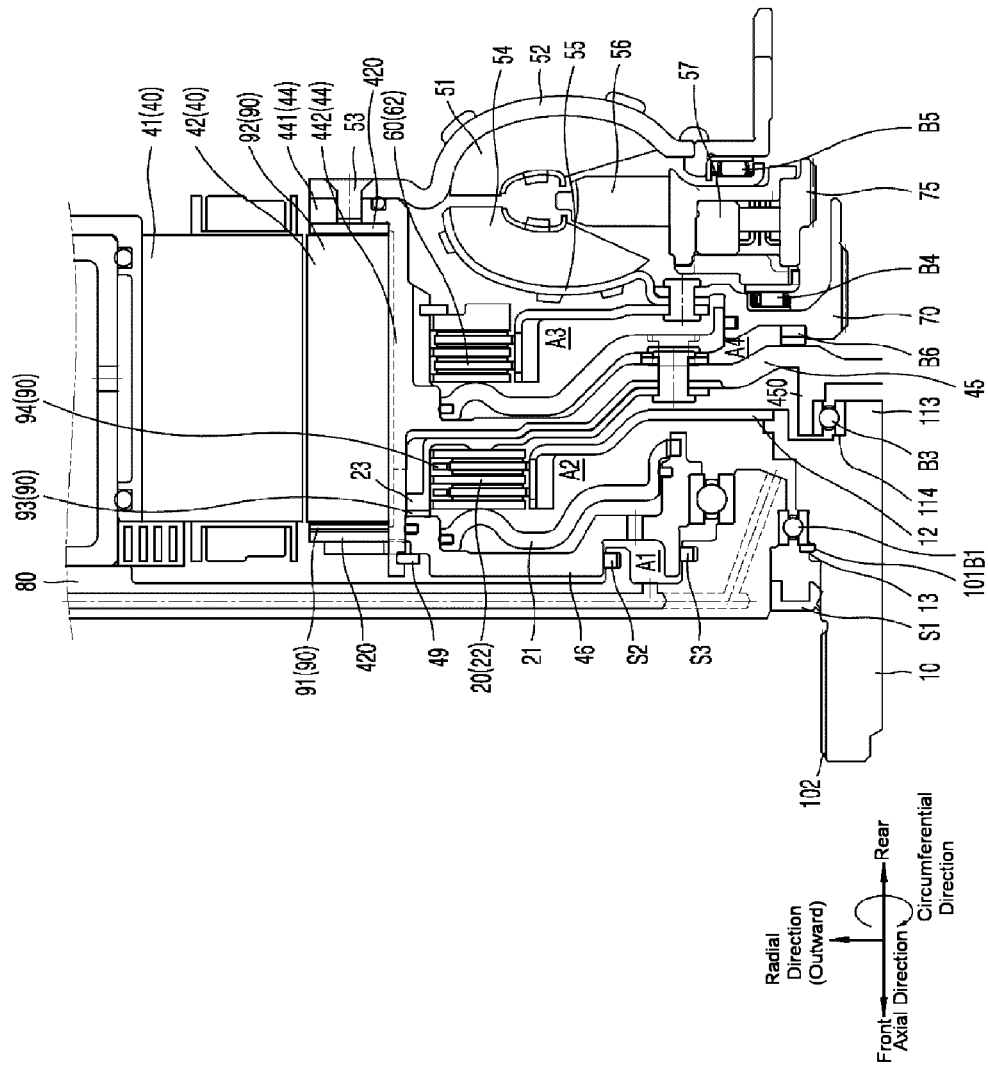
FIG. 11 is a conceptual view of a second embodiment of the hybrid driving module according to the present invention.
Figure 12:
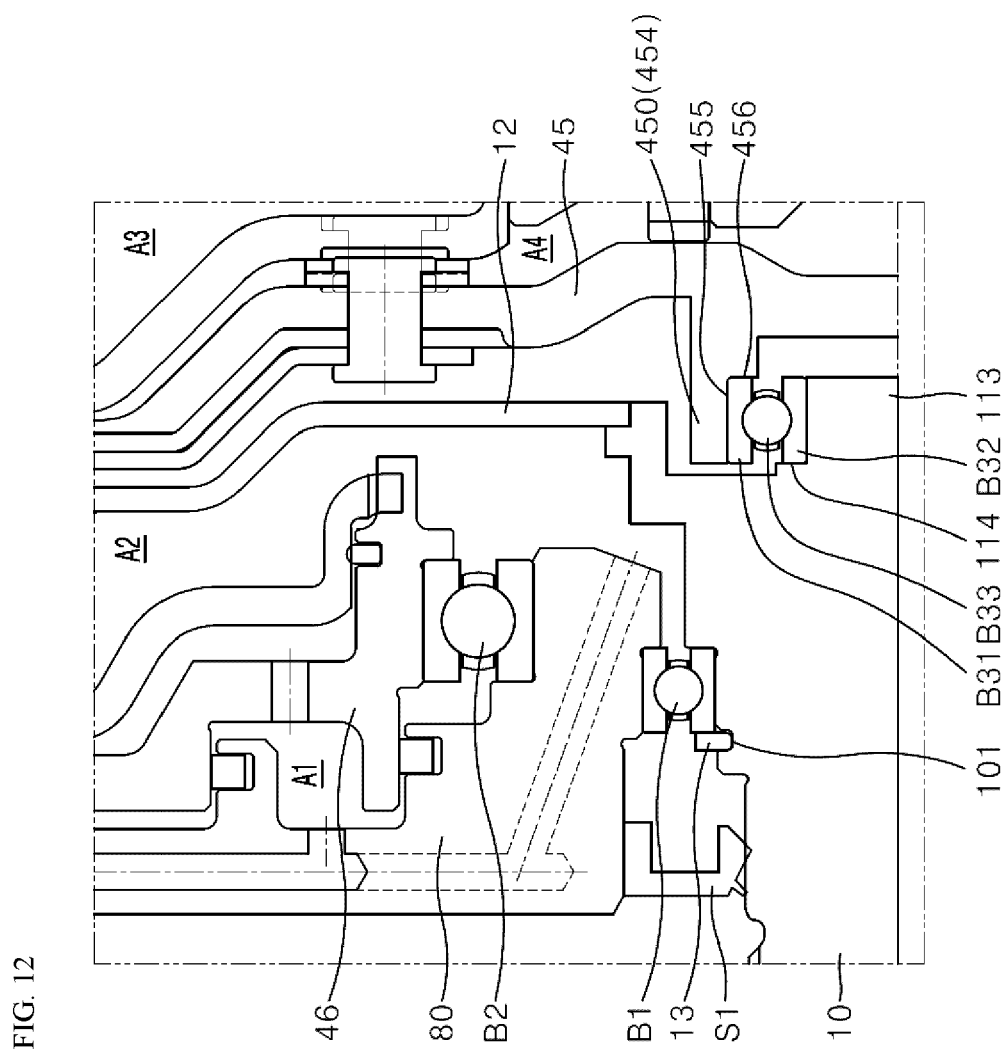
FIG. 12 is an enlarged view of a portion where the third bearing in FIG. 11 is installed.

Meanwhile, unlike the first embodiment, in a second embodiment illustrated in FIG. 11, the central shaft extension part 450 includes an outer hub shaft 454 having an inner peripheral support surface 455. An internal stepped portion 456 is provided on the inner peripheral support surface 455 at the rear side in the axial direction and has a decreased inner diameter of the outer hub shaft 454. The outer hub shaft 454 may have the same structure as a hollow cylinder.

An inner input shaft 113 extending backward is provided at a rotation center of a rear end of the input member 10. In the state in which the inner input shaft 113 is accommodated in a hollow portion of the outer hub shaft 454, an outer peripheral surface of the inner input shaft 113 faces the inner peripheral support surface 455 of the outer hub shaft 454. An axial front side of an outer peripheral surface of the inner input shaft 113 has an external support stepped portion 114 having an increased diameter.

The third bearing B3 is installed between the inner input shaft 113 and the outer hub shaft 454 that face each other in the radial direction. The outer peripheral surface of the outer race B31 of the third bearing B3 adjoins the inner peripheral support surface 455 of the outer hub shaft 454, and the rear surface of the outer race B31 of the third bearing B3 adjoins the front surface of the internal stepped portion 456 of the outer hub shaft 454. Because an inner diameter of the internal stepped portion 456 is larger than an outer diameter of the inner race B32, the internal stepped portion 456 and the inner race B32 do not interfere with each other even though the inner race B32 further moves backward than the outer race B31.

The inner peripheral surface of the inner race B32 of the third bearing B3 adjoins the outer peripheral surface of the inner input shaft 113, and the front surface of the inner race B32 of the third bearing B3 adjoins the rear surface of the external support stepped portion 114 of the inner input shaft 113. Because a diameter of the external support stepped portion 114 is smaller than an inner diameter of the outer race B31, the outer race B31 and the external support stepped portion 114 do not interfere with each other even though the outer race B31 further moves forward than the inner race B32.

The third bearing B3 according to the first and second embodiments accurately aligns the input member 10 with the rotor hub 43 in the radial direction and also in the axial direction.

Meanwhile, the first bearing B1 is installed on the inner peripheral surface of the radial inner end of the housing 80, and the second bearing B2 is installed on the outer peripheral surface of the radial inner end of the housing 80. The first bearing B1 aligns the input member 10 with the housing 80 in the axial direction and the radial direction, and the second bearing B2 aligns the hub ridge 46 with the housing 80 in the axial direction and the radial direction.

Therefore, the input member 10 is supported in the axial direction and the radial direction by the third bearing B3 and the central shaft extension part 450 of the rotor hub 43 at the rear side in the axial direction and supported in the axial direction and the radial direction by the housing 80 and the first bearing B1 at the front side in the axial direction. Therefore, an axial unbalance does not occur in the input member 10, thereby ensuring operability.

Further, the input member 10 is accurately aligned in the axial direction and does not move in the axial direction. Therefore, it is possible to prevent a tooth coupling portion between an outer periphery of the input plate 12 and an inner periphery of the first clutch pack 22 from being abraded or damaged.

[Assembly of Hybrid Driving Module]

Hereinafter, among the processes of assembling the hybrid driving module according to the embodiment, the assembling process related to the engine clutch 20, the input member 10, the rotor 42, the hub ridge 46, the housing 80, and the spring damper 9 will be described.

Figure 8:
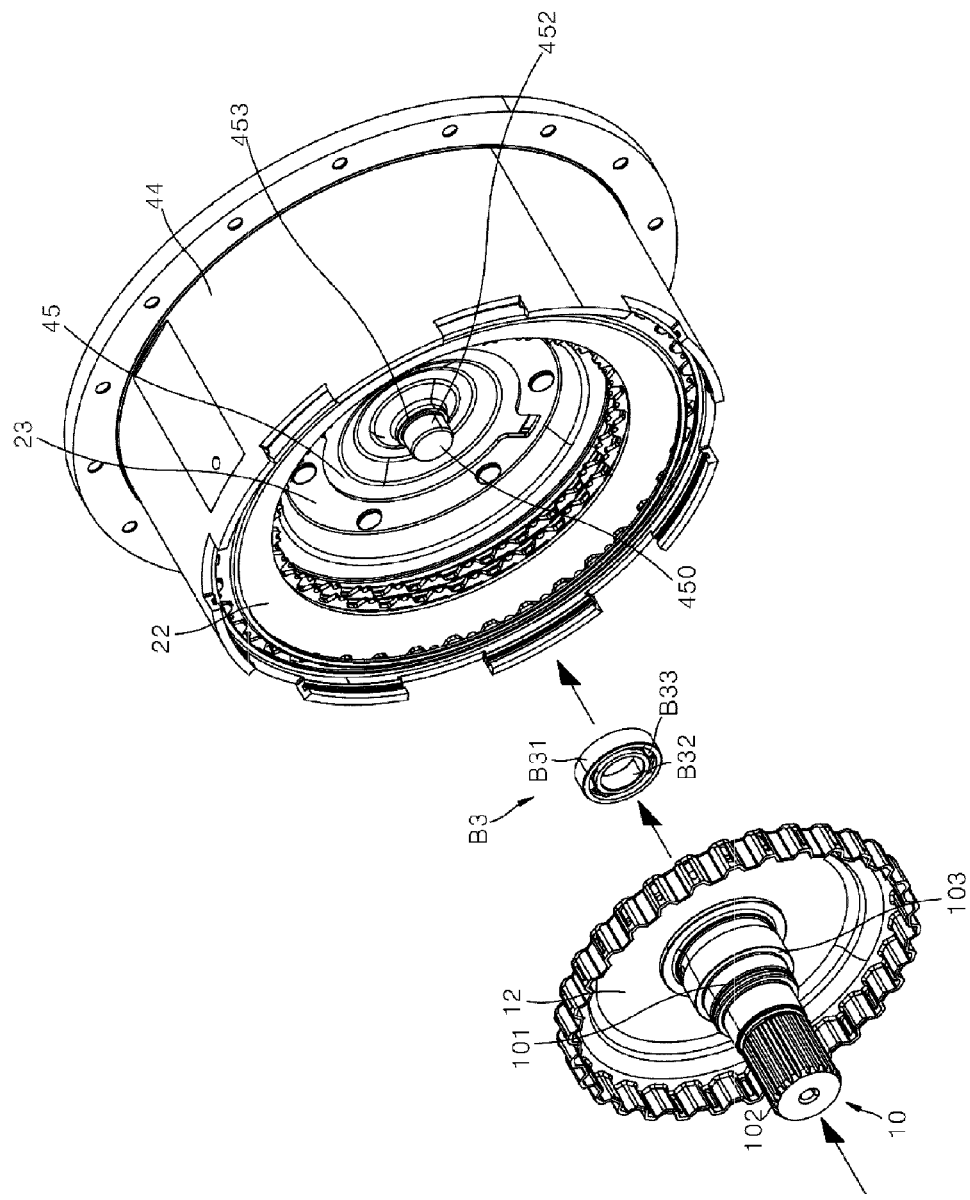
FIG. 8 is a perspective view illustrating a process in which a third bearing and an input member are installed on the rotor hub in FIG. 7.

First, the rotor 42 is externally inserted into the rotor holder 44 of the rotor hub 43 in the direction from the front side to the rear side in the axial direction. At the time of installing the rotor 42, the retainers 420 are installed at two opposite ends in the axial direction. Further, the first elastic body 91 and/or the second elastic body 92 is installed. Further, as illustrated in FIG. 8, the engine clutch 20 is installed on the front surface of the hub plate 45. To this end, the first carrier 23 of the engine clutch 20 is fixed to the hub plate 45 by riveting or the like. The first clutch pack 22 is installed on the first carrier 23. In this case, the fourth elastic body 94 may be installed on the first clutch pack 22 of the engine clutch 20. In addition, the engine clutch 20 may be installed on the rotor hub 43, and then the third elastic body 93 may be installed at the front side of the first carrier 23 of the engine clutch 20.

Next, as illustrated in FIG. 8, the input member 10 having the rear end to which the input plate 12 is welded is installed on the central shaft extension part 450 of the hub plate 45. In this case, the third bearing B3 is interposed between the input member 10 and the hub plate 45, and the radial outer end of the input plate 12 meshes with the inner periphery of the first clutch pack 22.

Figure 9:
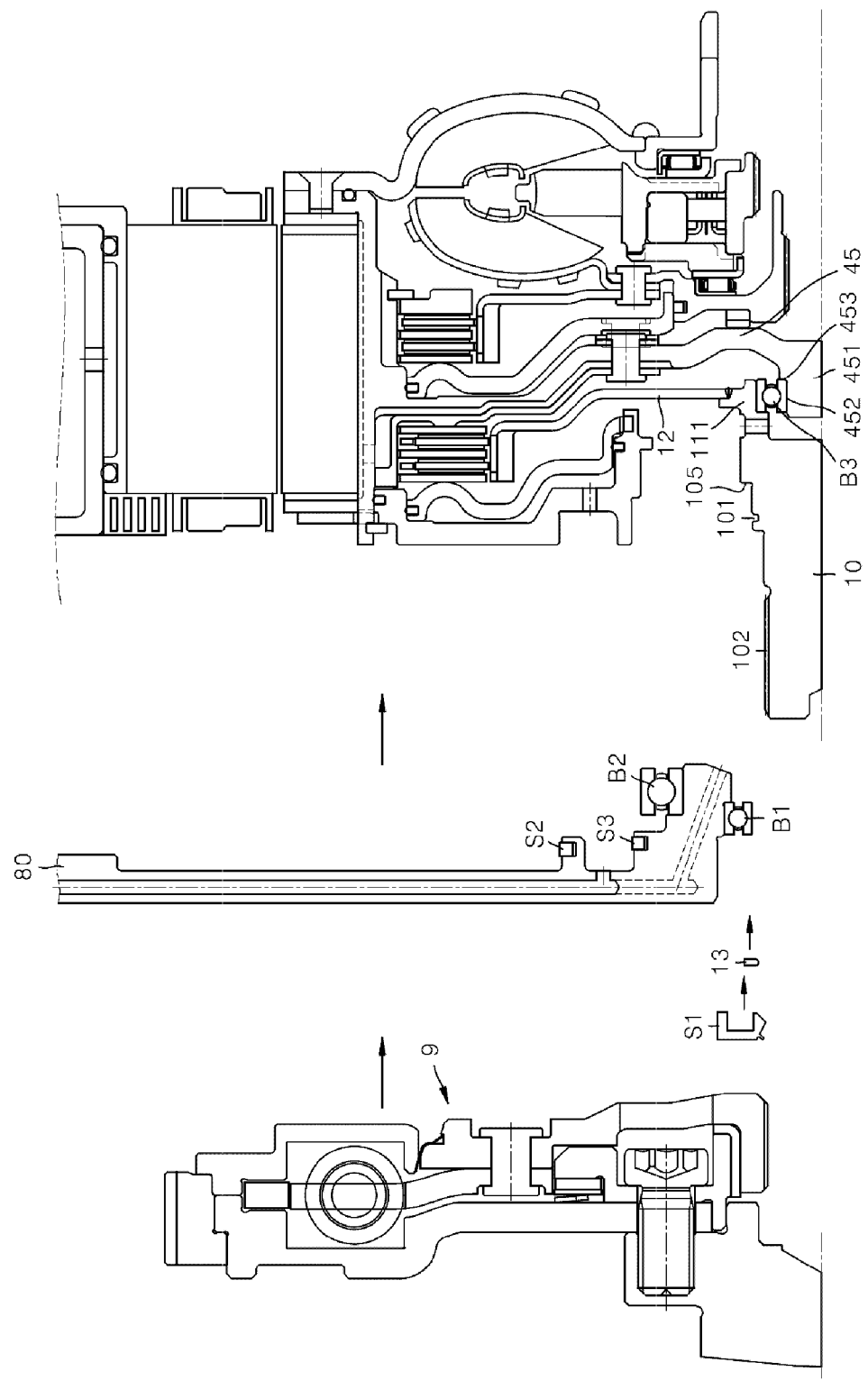
FIG. 9 is a cross-sectional side view illustrating a state in which the housing and the spring damper are installed on the rotor hub in FIG. 8.
Figure 10:
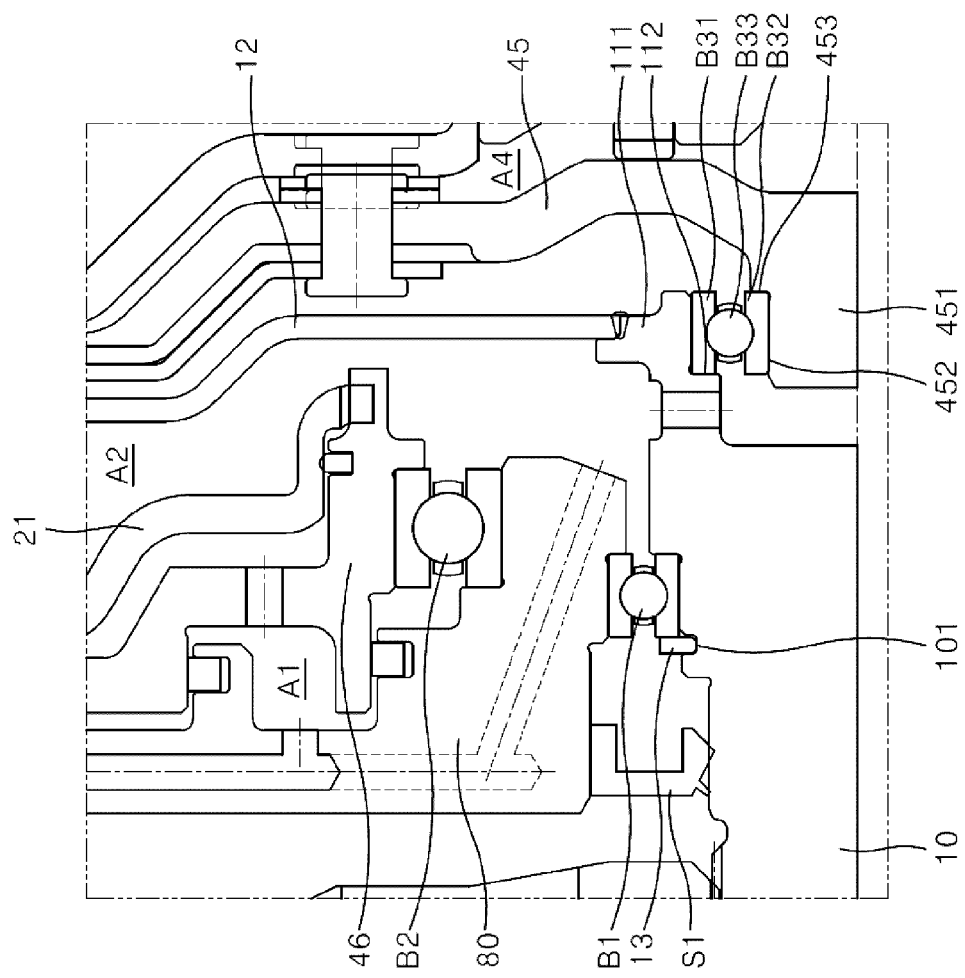
FIG. 10 is an enlarged view of a portion where the third bearing in FIG. 1 is installed.

Next, as illustrated in FIG. 9, the hub coupling portion 460 of the hub ridge 46 on which the first piston plate 21 is installed is assembled with the spline shape portion 443 and the spline groove 444 of the rotor holder 44 and fitted with the piston installation portion 464, and the ridge snap ring 49 is fitted with the snap groove 4433 provided in the inner peripheral surface of the spline shape portion 443. In this case, the radius extension portion 462 of the hub ridge 46 supports the front end of the rotor 42, and the elastic body 90 presses the hub ridge 46 against the ridge snap ring 49, such that the hub ridge 46 is securely supported without swaying.

Next, as illustrated in FIG. 9, the radial inner end of the housing 80 is assembled and interposed between the hub ridge 46 and the input member 10. In this case, the first bearing B1 may be assembled first in the state of being fitted with the housing 80. As illustrated, the second bearing B2 is assembled first in the state of being fitted with the housing 80 or assembled first in the state of being fitted with the hub ridge 46.

The assembling of the housing 80 is performed after the input member 10 is aligned with the central shaft extension part 450 of the rotor hub 43 in all the radial direction and the axial direction by the third bearing B3 and the hub ridge 46 is also aligned with the rotor holder 44 of the rotor hub 43 in all the radial direction and the axial direction. Therefore, during the assembling of the housing 80, the process of assembling and fitting the housing 80 between the hub ridge 46 and the input member 10, which are previously aligned, may be very smoothly performed. Further, the insert groove 101 of the input member 10 is assuredly exposed in the state in which the housing 80 is interposed between the hub ridge 46 and the input member 10, such that the process of fastening the bearing snap ring 13 to the insert groove 101 of the input member 10 is very easily performed.

After the housing 80 is assembled and the bearing snap ring 13 is fastened, the first sealing member S1 is interposed between the housing 80 and the input member, and the spring damper 9 is fastened to the spline 102 exposed forward.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A hybrid driving module comprising:
   a motor including a stator and a rotor;

a housing configured to support the stator;

a rotor hub configured to support the rotor and rotate integrally with the rotor;

a hub ridge connected to and extending radially inward from a front end of the rotor hub, the hub ridge being aligned in a radial direction by a radial inner end of the housing; and an input member axially aligned with the rotor hub and configured to be rotatable relative to the rotor hub, the input member being disposed axially forward of the rotor hub aligned in the radial direction by the radial inner end of the housing disposed radially outside the input member and configured to receive an output of an engine, wherein the rotor hub comprises:
- a rotor holder configured to support the rotor;
- a hub plate connected to the rotor holder and extending radially from the rotor holder; and
- a central shaft extension part extending axially forward from a rotation center of the hub plate, and wherein a rear end of the input member is aligned in the radial direction and an axial direction by the central shaft extension part.

2. The hybrid driving module of claim 1, wherein a third bearing interposed between the input member and the central shaft extension part aligns the input member with the central shaft extension part in the radial direction and the axial direction.

3. The hybrid driving module of claim 1, wherein the input member has a cylindrical outer input shaft extending backward from a rear end thereof and having a hollow portion opened backward, the central shaft extension part has an inner hub shaft extending forward and accommodated in a hollow portion of the outer input shaft, and a third bearing is interposed between an inner peripheral surface of the outer input shaft and an outer peripheral support surface of the inner hub shaft.

4. The hybrid driving module of claim 3, wherein an external stepped portion having an increased diameter is provided at a rear side of the outer peripheral support surface of the inner hub shaft, an inner race of the third bearing is supported in the axial direction by the external stepped portion, an internal support stepped portion having a decreased inner diameter is provided at a front side of the inner peripheral surface of the outer input shaft, and an outer race of the third bearing is supported in the axial direction by the internal support stepped portion.

5. The hybrid driving module of claim 1, wherein the central shaft extension part has a cylindrical outer hub shaft extending forward and having a hollow portion opened forward, the input member has an inner input shaft extending backward from a rear end thereof and accommodated in a hollow portion of the outer hub shaft, and a third bearing is interposed between an inner peripheral support surface of the outer hub shaft and an outer peripheral surface of the inner input shaft.

6. The hybrid driving module of claim 5, wherein an internal stepped portion having an decreased inner diameter is provided at a rear side of the inner peripheral support surface of the outer hub shaft, an outer race of the third bearing is supported in the axial direction by the internal stepped portion, an external support stepped portion having an increased diameter is provided at a front side of the outer peripheral surface of the inner input shaft, and an inner race of the third bearing is supported in the axial direction by the external support stepped portion.

7. The hybrid driving module of claim 1, wherein a first axial position at which the input member is aligned in the radial direction by the central shaft extension part is different from a second axial position at which the input member is aligned in the radial direction by the housing.

8. The hybrid driving module of claim 7, wherein the second axial position is disposed forward of the first axial position.

9. The hybrid driving module of claim 1, wherein a first bearing is interposed between the input member and the radial inner end of the housing, the input member has a bearing stepped portion configured to support a rear end of the first bearing, an insert groove extending in an annular shape in a circumferential direction is provided on an outer peripheral surface of the input member, and a bearing snap ring inserted into the insert groove supports a front end of the first bearing.

10. The hybrid driving module of claim 1, wherein the radial inner end of the housing is disposed between the hub ridge and the input member in the radial direction.

11. The hybrid driving module of claim 1, wherein an input plate is provided at a rear end of the input member, is connected to the input member, extends radially outward from the input member, and is configured to rotate integrally with the input member, and an engine clutch configured to control whether to transmit power between the input plate and the rotor hub is provided in a space disposed radially inside the rotor holder and provided at an axial front side of the hub plate.

12. The hybrid driving module of claim 11, a first piston plate configured to press or release the engine clutch in the axial direction is installed on the hub ridge so as to be slidable in the axial direction.

* * * * *